US012659215B2

(12) United States Patent
Hsu et al.

(10) Patent No.: US 12,659,215 B2
(45) Date of Patent: Jun. 16, 2026

(54) SYSTEM AND METHOD FOR FRONTHAUL DOWNLINK IQ DATA COMPRESSION

(71) Applicant: Quanta Cloud Technology Inc., Taipei City (TW)

(72) Inventors: Hsiao-Cheng Hsu, Taipei City (TW); Ji-Jeng Lin, Taipei City (TW); Chia-Jui Lee, Taipei City (TW)

(73) Assignee: QUANTA CLOUD TECHNOLOGY INC., Taipei City (TW)

( * ) Notice: Subject to any disclaimer, the term of this patent is extended or adjusted under 35 U.S.C. 154(b) by 0 days.

(21) Appl. No.: 18/828,717

(22) Filed: Sep. 9, 2024

(65) Prior Publication Data

US 2026/0074943 A1      Mar. 12, 2026

(51) Int. Cl.
H04L 27/34       (2006.01)
H04L 27/00       (2006.01)
H04L 27/38       (2006.01)

(52) U.S. Cl.
CPC ...... H04L 27/3405 (2013.01); H04L 27/0012 (2013.01); H04L 27/3818 (2013.01)

(58) Field of Classification Search
CPC ............. H04L 27/0012; H04L 27/3405; H04L 27/3818
See application file for complete search history.

(56) References Cited

U.S. PATENT DOCUMENTS

| | | | |
|---|---|---|---|
| 12,381,764 B2 * | 8/2025 | Ferrieux ............... | H04L 1/0006 |
| 2023/0023553 A1 | 1/2023 | Jang et al. | |
| 2023/0180055 A1 * | 6/2023 | Gorain .................. | H04W 28/06 |
| | | | 370/329 |
| 2024/0171241 A1 * | 5/2024 | Lu ........................ | H04B 7/0456 |

* cited by examiner

*Primary Examiner* — David B Lugo
(74) *Attorney, Agent, or Firm* — NIXON PEABOIDY LLP

(57)      ABSTRACT

A system includes one or more data processors. The system further includes a non-transitory computer-readable storage medium containing instructions which, when executed on the one or more data processors, cause the one or more data processors to perform operations. The operations include receiving a stream of in-phase components and quadrature phase components as IQ data. The IQ data indicates which subcarriers each of the IQ data is to be sent. The operations further include determining a maximum absolute value associated with the IQ data, determining a constellation measure of a largest bounding box covering all subcarriers of the IQ data, and compressing the IQ data to obtain compressed IQ data based on the maximum absolute value and the constellation measure.

20 Claims, 11 Drawing Sheets

Receive compressed IQ data — 1002

Determine a maximum absolute value and a constellation measure associated with the compressed IQ data — 1004

Scale the compressed IQ data using the maximum absolute value and the constellation measure — 1006

Post-process the scaled IQ data to obtain the de-compressed IQ data — 1008

Example:
  • M value $=6664_{(10)}=0001\ 1010\ 0000\ 1000_{(2)}$ (raw data 14bits)
  • 6bits~16bits iqWidth with EVM evaluation

SYSTEM AND METHOD FOR FRONTHAUL DOWNLINK IQ DATA COMPRESSION

FIELD OF THE INVENTION

The present invention relates generally to communications technology in computing systems, and more specifically, to systems and methods for compressing and decompressing data packets.

BACKGROUND OF THE INVENTION

Computing systems (e.g., servers, desktop computers, laptop computers, etc.) are used in different contexts for a wide range of functions. Some computing systems operate on batteries and may require low-power operation to conserve charge on the batteries. On the other hand, some computing systems may be plugged into a power outlet, and low-power operation is not as important as computing performance. Computing systems can be provided in a network, allowing for different computing systems in the network to perform different functions. Different network configurations have different topologies. The different topologies and agreed-upon standard can affect how computing systems communicate with each other. Communication typically consumes network resources. The present disclosure provides systems and methods associated with compressing communication packets to conserve network resources.

SUMMARY OF THE INVENTION

The term embodiment and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate portions of the entire specification of this disclosure, any or all drawings, and each claim.

According to certain aspects of the present disclosure, a system includes one or more data processors. The system further includes a non-transitory computer-readable storage medium containing instructions which, when executed on the one or more data processors, cause the one or more data processors to perform operations. The operations include receiving a stream of in-phase components and quadrature phase components as IQ data. The IQ data indicates which subcarriers each of the IQ data is to be sent. The operations further include determining a maximum absolute value associated with the IQ data, determining a constellation measure of a largest bounding box covering all subcarriers of the IQ data, and compressing the IQ data to obtain compressed IQ data based on the maximum absolute value and the constellation measure.

In an implementation, the IQ data includes 12 subcarriers. In an implementation, a number of bits of each in-phase component is 16 bits and a number of bits of each quadrature component is 16 bits. In an implementation, executing the instructions further causes the one or more data processors to perform operations including determining a modulation scheme associated with transmitting the IQ data. The modulation scheme can be one of QPSK, 16-QAM, 64-QAM or 256-QAM.

In an implementation, executing the instructions further causes the one or more data processors to perform operations including sending the compressed IQ data to a radio unit. In an implementation, a distribution unit sends the compressed IQ data to the radio unit. In an implementation, the compressed IQ data includes the maximum absolute value and the constellation measure. In an implementation, a number of bits associated with the constellation measure is less than a number of bits associated with the maximum absolute value. The compressed IQ data preserves information contained in the IQ data.

According to certain aspects of the present disclosure, a system includes one or more data processors. The system further includes a non-transitory computer-readable storage medium containing instructions which, when executed on the one or more data processors, cause the one or more data processors to perform operations. The operations include receiving compressed IQ data. The compressed IQ data include (i) a maximum absolute value associated with a stream of IQ data and (ii) a constellation measure of a largest bounding box covering all subcarriers of the stream of IQ data. The operations further include determining the maximum absolute value associated with the IQ data, determining the constellation measure associated with the IQ data, scaling at least a portion the compressed IQ data based on the maximum absolute value and the constellation measure, and post-processing the scaled IQ data to obtain de-compressed IQ data.

In an implementation, the stream of IQ data and the de-compressed IQ data are the same. In an implementation, the post-processing includes rounding. In an implementation, a modulation scheme associated with the stream of IQ data is one of QPSK, 16-QAM, 64-QAM or 256-QAM.

According to certain aspects of the present disclosure, a method performed by a computing system includes receiving a stream of in-phase components and quadrature phase components as IQ data, the IQ data indicating which subcarriers each of the IQ data is to be sent. The method further includes determining a maximum absolute value associated with the IQ data, determining a constellation measure of a largest bounding box covering all subcarriers of the IQ data, and compressing the IQ data to obtain compressed IQ data based on the maximum absolute value and the constellation measure.

In an implementation, executing the instructions further causes the one or more data processors to perform operations including determining a modulation scheme associated with transmitting the IQ data. In an implementation, the modulation scheme is one of QPSK, 16-QAM, 64-QAM or 256-QAM. In an implementation, executing the instructions further causes the one or more data processors to perform operations including sending the compressed IQ data to a radio unit. In an implementation, a distribution unit sends the compressed IQ data to the radio unit. In an implementation, the compressed IQ data includes the maximum absolute value and the constellation measure.

The above summary is not intended to represent each embodiment or every aspect of the present disclosure. Rather, the foregoing summary merely provides an example of some of the novel aspects and features set forth herein.

The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

FIG. 7 is an example constellation diagram for 256-QAM, according to certain aspects of the present disclosure.

DETAILED DESCRIPTION

Figure 1:
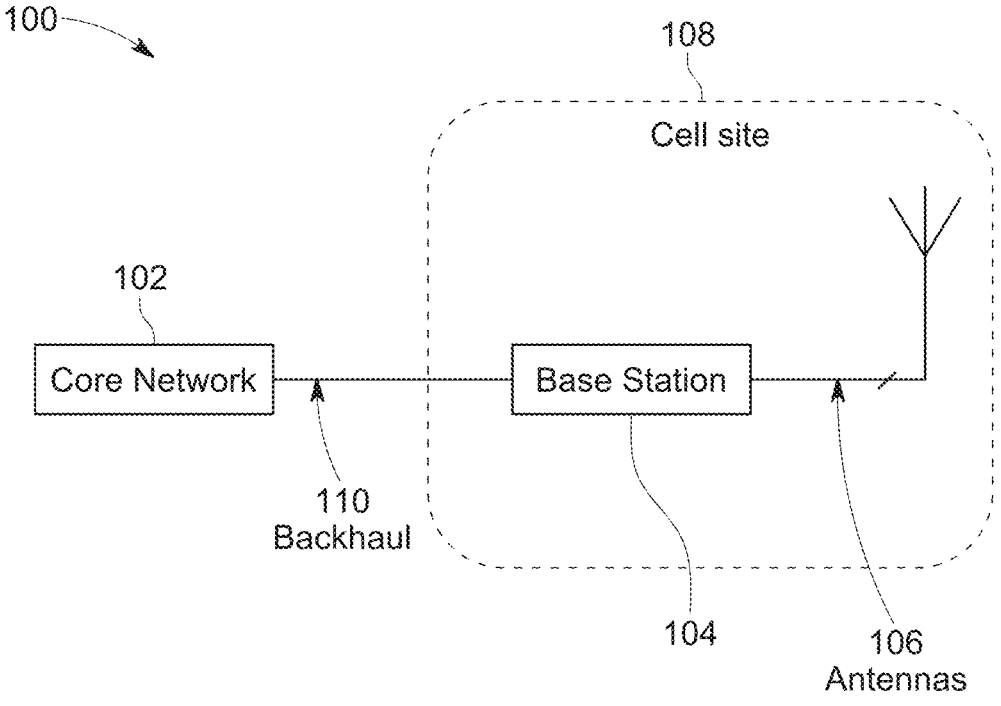
FIG. 1 is a block diagram of a distributed radio access network (DRAN) architecture.

In Open Radio Access Network (ORAN) specification, block floating point compression is used in the fronthaul interface and is a very common compression scheme for in-phase and quadrature (IQ) data compression. In block floating point compression specified in ORAN, the width of the IQ data can be selected from 6 bits to 16 bits. Higher compression ratios result in higher distortion of the original data. A tradeoff exists when choosing compression ratios to reduce distortion while considering communication resources for downlink throughput. Embodiments of the present disclosure provide methods and systems for compressing downlink IQ data. In some implementations, the compression ratio is similar to the compression ratio of a 6 bit block floating point compression. In some implementations, IQ data can be transferred from a distributed unit (DU) to a radio unit (RU) without loss of information (i.e., without distortion).

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features can be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, can be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

In a mobile or cellular/wireless network, two domains are typically provided. The first domain is a radio access network (RAN) and the second domain is a core network. The radio access network is typically the final link between the wireless network and users' wireless devices (e.g., phones, user equipment, etc.). The radio access network includes antenna(s) and base station(s), and signals from users' wireless devices are digitized in the RAN base station and connected to the core network. The core network can provide access controls, ensuring users are authenticated for services they are using. The core network can route telephone calls over the public switched telephone network. The core network can allow operators to charge for calls and data use. The core network can connect users to the rest of the world via the Internet. The core network can facilitate handovers as users move from coverage provided by one RAN tower to another RAN tower. How these two domains (i.e., the RAN and the core network) are organized can differ in wireless network implementations.

Referring to FIG. 1, a block diagram of a distributed radio access network (DRAN) architecture 100 is provided. The DRAN architecture 100 includes a core network 102 and a base station 104 with antennas 106. The base station 104 and the antennas 106 are located at a cell site 108. The base station 104 and the core network 102 are communicatively coupled via the backhaul 110.

The DRAN is a classic setup with the base station 104 including both a remote radio unit and a baseband unit co-located at the cell site 108. Although one cell site 108 is shown, the cell site 108 can be a plurality of cell sites having remote radio units and baseband units co-located at every cell site. In the DRAN, each cell site and all of its functions are located in one location and connected back to the core network 102 via the backhaul 110. The remote radio units and the baseband units run proprietary applications on specialized hardware. A cell site is the entire set of equipment needed to receive and transmit radio signals for cellular voice and data transmission, and typically includes transmitters, receivers, power amplifiers, combiners, filters, a digital signal processor, a power supply and network interface modules.

Figure 2:
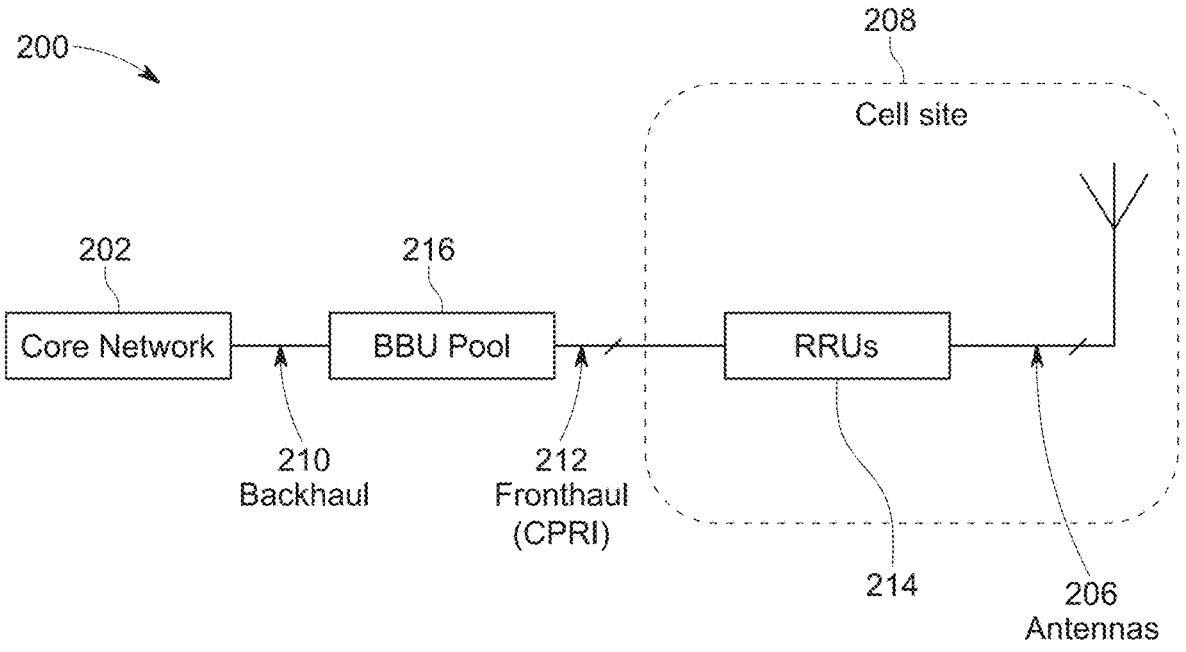
FIG. 2 is a block diagram of a centralized RAN (CRAN) architecture.

Referring to FIG. 2, a block diagram of a centralized RAN (C-RAN) architecture 200 is provided. The C-RAN architecture 200 includes a core network 202, a baseband unit (BBU) pool 216, and remote radio units (RRUs) 214. RRUs 214 are located at a cell site 208. The BBU pool 216 and the core network 202 are communicatively coupled via a backhaul 210, and the BBU pool 216 and the RRUs 214 are communicatively coupled via a fronthaul 212. In some cases, the fronthaul 212 is a Common Public Radio Interface (CPRI). In the C-RAN, BBUs from several sites are grouped into a pool and placed in one location. This allows for more efficient use of computing resources, but a single vendor is needed for both software and hardware components of the BBU pool 216.

Figure 3:
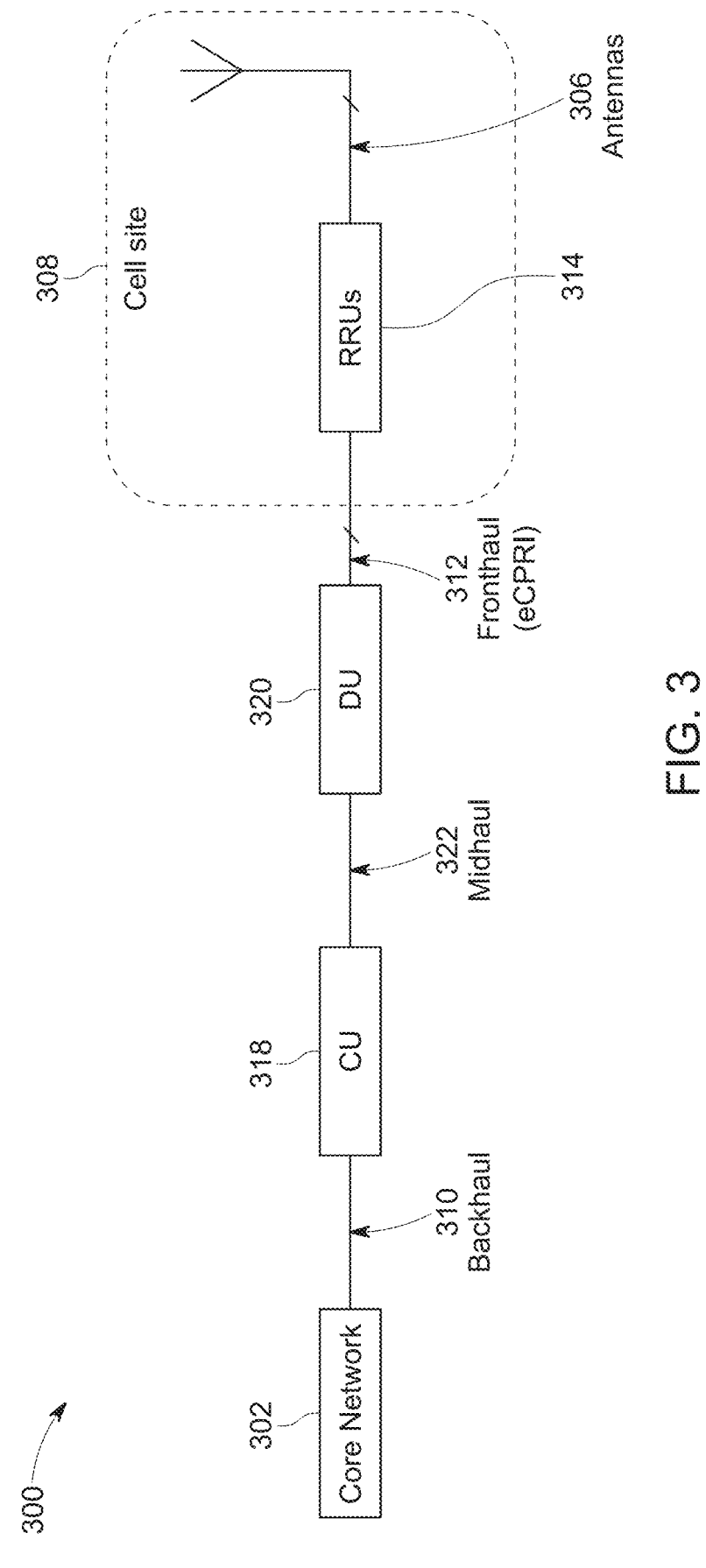
FIG. 3 is a block diagram of open RAN (ORAN) architecture, according to certain aspects of the present disclosure.

Referring to FIG. 3, a block diagram of open RAN (ORAN) architecture 300 is provided, according to certain aspects of the present disclosure. The ORAN architecture 300 includes a core network 302, one or more central units (CUs) 318, a one or more distributed units (DUs) 320, and one or more RRUs 314 with antennas 306. The RRUs 314 are located at a cell site 308. The core network 302 and the one or more CUs 318 are communicatively coupled via a backhaul 310, the one or more CUs 318 and the one or more DUs 320 are communicatively coupled via a midhaul 322, and the one or more DUs 320 and the one or more RRUs 314 are communicatively coupled via a fronthaul 312. In some implementations, the fronthaul 312 is an enhanced Common Public Radio Interface (eCPRI). ORAN looks to improve compatibility between vendors by opening interfaces inside the base station. In ORAN, the RAN is disaggregated into three main blocks—the RRUs, the DUs, and the CUs. The RRU is where the radio frequency signals are transmitted, received, amplified, and digitized. The RRUs are located near to or integrated into the antenna. The DU is the computational part of the base station and can physically be located at or near the RU. The CU is a computational part of the base station but is typically located near the core network.

ORAN decouples software and hardware by virtualizing network functions. ORAN deploys CUs and DUs on top of commercial off the shelf servers using, for example, virtual machines (a virtual network function (VNF) approach) or containers (cloud-native network function (CNF) approach). Even though ORAN and C-RAN architectures look similar, ORAN is deployed on top of commercial off the shelf servers one would find in a datacenter, while C-RAN uses proprietary hardware. ORAN specification describes open fronthaul, midhaul, and backhaul interfaces.

Figure 4:
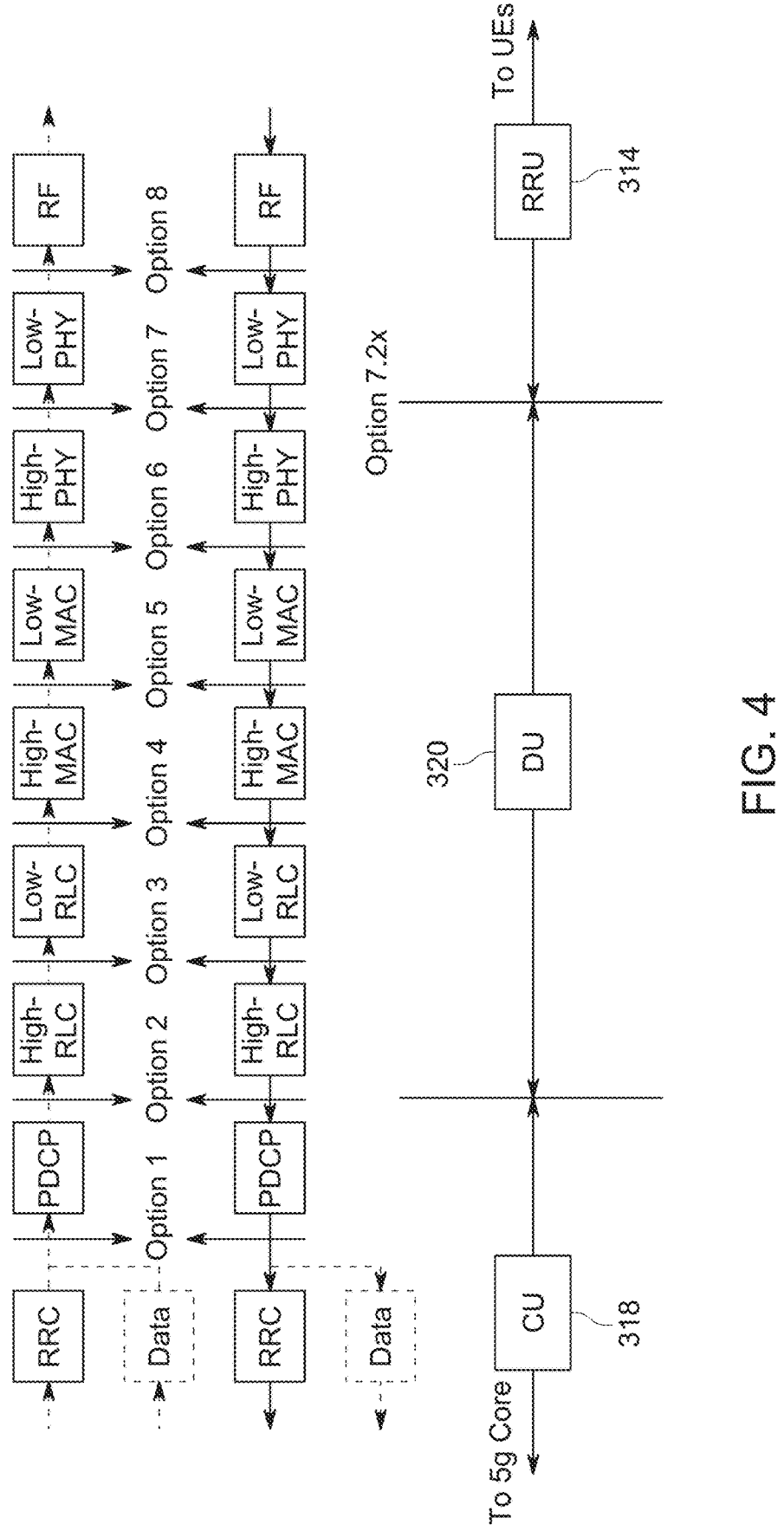
FIG. 4 is a block diagram illustrating different option splits in a radio access network (RAN), according to certain aspects of the present disclosure.

Referring to FIG. 4, a block diagram illustrating different option splits in a RAN is provided, according to certain aspects of the present disclosure. Because ORAN allows the RAN functional separation architecture to be fully virtualized, CU and DU functions run as virtual software functions on standard commercial off the shelf hardware and can be deployed in any RAN tiered datacenter.

In ORAN specification, block floating point compression is the downlink and uplink standard for the fronthaul interface (e.g., the fronthaul 312 implementing a 5G eCPI protocol). Block floating point is the most popular compression method for IQ data compression. The IQ width of BFP compression can range from 6 bits to 16 bits. A higher compression ratio can result in higher distortion of the IQ data. So, the compression ratio and IQ data distortion is one tradeoff when considering support for maximum downlink throughput. Embodiments of the present disclosure provide systems and methods that can provide similar performance with a block floating point 6 bits compression ratio in a lossless manner when IQ data is transferred from DU 320 to RU 314. Embodiments of the present disclosure can introduce compression of IQ data for RU transmission with zero distortion. At the same fronthaul speed, 10 GbE, the maximum bandwidth, 200 MHz, could be double improved or MIMOs paths could be double, 8×8, for supporting per RU. Embodiments of the present disclosure can be implemented as simple as the block floating point decompression method and is easily implemented on the current ORAN fronthaul system and standard enhanced common public radio interface (cCPRI).

Throughput at the fronthaul should be very fast, and thus a lot of data needs to be compressed for high throughput. If the bandwidth is not too high, then no need to run the compression algorithm. In FIG. 4, the Low PHY/High PHY split between the RRU 314 and the DU 320 is the most acceptable approach for it is less complex and supports various fronthaul requirements. And most importantly, it provides high virtualization benefits. This split has been further optimized by the O-RAN Alliance into two variants: split 7.2a and split 7.2b. Split 7.2x allows fronthaul compression techniques like block floating point IQ compression and decompression to further reduce transport bandwidth. In the present disclosure, ORAN is used here as an example, but embodiments of the present disclosure may be used with any communication standard that supports a split where IQ compression and decompression is possible.

Figure 5:
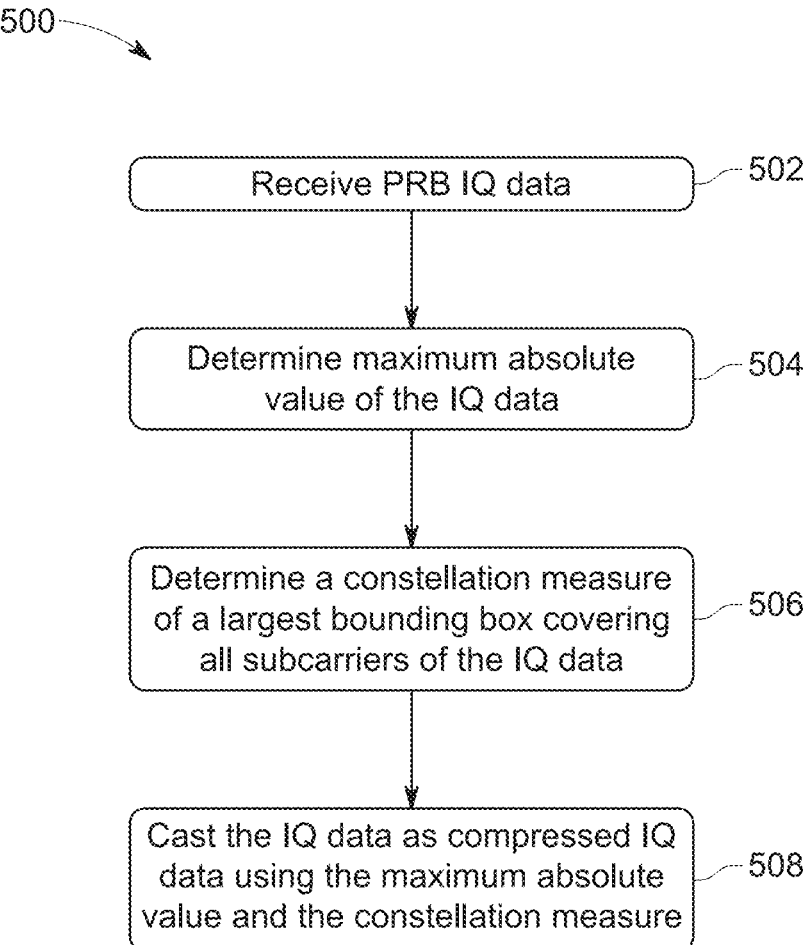
FIG. 5 is a flow diagram illustrating steps for compressing IQ data, according to certain aspects of the present disclosure.

Referring to FIG. 5, a flow diagram illustrating a process 500 for compressing IQ data is provided, according to certain aspects of the present disclosure. The process 500 can be performed by the DU 320 of the ORAN architecture 300 to communicate IQ signals from the DU 320 to the RRU 314 via the fronthaul 312. The process 500 can be performed by a first computing system communicating with a second computing system and is not limited to the ORAN architecture. The ORAN architecture is used here as an example with the first computing system pertaining to the DU 320 and the second computing system pertaining to the RRU 314.

At step 502, the DU 320 receives physical resource block IQ data to be transmitted to the RRU 314. In some implementations, data is received from the CU 318 and the DU 320 packages the data as IQ data to be sent to the RRU 314. In some implementations, the physical resource block is composed of a number of subcarriers (e.g., 12 subcarriers, 14 subcarriers, etc.). Each subcarrier is represented by a complex number having a real part and an imaginary part. The real part is the in-phase component of the IQ data and the imaginary part is the quadrature phase component of the IQ data.

include QPSK or QAM. In some implementations, the modulation scheme is BPSK, QPSK, 16-QAM, 64-QAM, 256-QAM, etc.

In an example, IQ data of one physical resource block for one symbol is provided by Table 1.

TABLE 1

| | | | | | Example IQ data in a PRB | | | | | | |
|---|---|---|---|---|---|---|---|---|---|---|---|
| $X1_i$ | $X2_i$ | $X3_i$ | $X4_i$ | $X5_i$ | $X6_i$ | $X7_i$ | $X8_i$ | $X9_i$ | $X10_i$ | $X11_i$ | $X12_i$ |
| 5775 | 2221 | 5775 | −3998 | 444 | −5775 | 3998 | 1333 | 4887 | 6664 | −5775 | 2221 |
| $X1_q$ | $X2_q$ | $X3_q$ | $X4_q$ | $X5_q$ | $X6_q$ | $X7_q$ | $X8_q$ | $X9_q$ | $X10_q$ | $X11_q$ | $X12_q$ |
| 5775 | −444 | 3998 | 2221 | −6664 | −2221 | 3998 | −4887 | −4887 | −3998 | −3998 | 1333 |

In some implementations, the IQ data is provided as X in (1), representing a stream of IQ values.

$$X = \{X1_i X1_q X2_i X2_q \ ... \ XN_i XN_q\} \qquad (1)$$

In (1), N is the number of subcarriers, and each value in X is a j-bit number where j is an integer. The stream of IQ values includes 2N numbers with N numbers representing in-phase components and the other N representing quadrature components. The subscripts i and q identify in-phase and quadrature, respectively. $X1_i$ and $X1_q$ represent in-phase component for a first carrier and quadrature phase component for the first carrier, respectively. Similarly, $XN_i$ and $XN_q$ represent in-phase component for an N-th carrier and quadrature phase component for the N-th carrier, respectively.

In Table 1, the 16 bits of each X value are quoted in decimal. For example, $X6_q = -2221_{10}$ is the equivalent of $1111\ 0111\ 0101\ 0011_2$.

At step 504, the DU 320 determines a maximum absolute value of the IQ data. The stream of values in (1) is treated as a set. The DU 320 performs a max operation on X according to (2).

$$X_{max} = \max(\{X1_i X1_q X2_i X2_q \ ... \ XN_i XN_q\}) \qquad (2)$$

In (2), $X_{max}$ is the maximum magnitude value of the stream of IQ data.

In the example of Table 1, the maximum magnitude is 6664, appearing in $X10_i$ and $X5_q$.

At step 506, the DU 320 determines a constellation measure (K) of a largest bounding box covering all subcarriers of the IQ data. The constellation measure depends on the modulation scheme. For example, Table 2 provides different values K for the constellation measure.

TABLE 2

| | Shorthand coordinates based on different maximum K values and modulation scheme | | |
|---|---|---|---|
| Modulation | Ratio with abs (max. length) | Ratio with abs (2nd max. length) | Ratio with abs (3rd max. length) . . . |
| BSPK | ±1 | ±1 | ±1 |
| QPSK | ±1 | ±1 | ±1 |
| 16QAM | ±1/3, ±3/3 | ±1 | ±1 |
| 64QAM | ±1/7, ±3/7, ±5/7, ±7/7 | ±1/5, ±3/5, ±5/5 | ±1/3, ±3/3 |
| 256QAM | ±1/15, ±3/15, ±5/15, ±7/15, ±9/15, ±11/15, ±13/15, ±15/15 | ±1/13, ±3/13, ±5/13, ±7/13, ±9/13, ±11/13, ±13/13 | ±1/11, ±3/11, ±5/11, ±7/11, ±9/11, ±11/11 |

In some implementations, to comport with ORAN standards, the number of subcarriers N is 12, and each value in X is a 16-bit number. In such implementations, stream of IQ values includes 24 serial component data that should be compressed, with 12 of the 24 serial component data corresponding to in-phase components and the other 12 of the 24 serial component data corresponding to quadrature phase components.

Figures 6A, 6B, 6C:
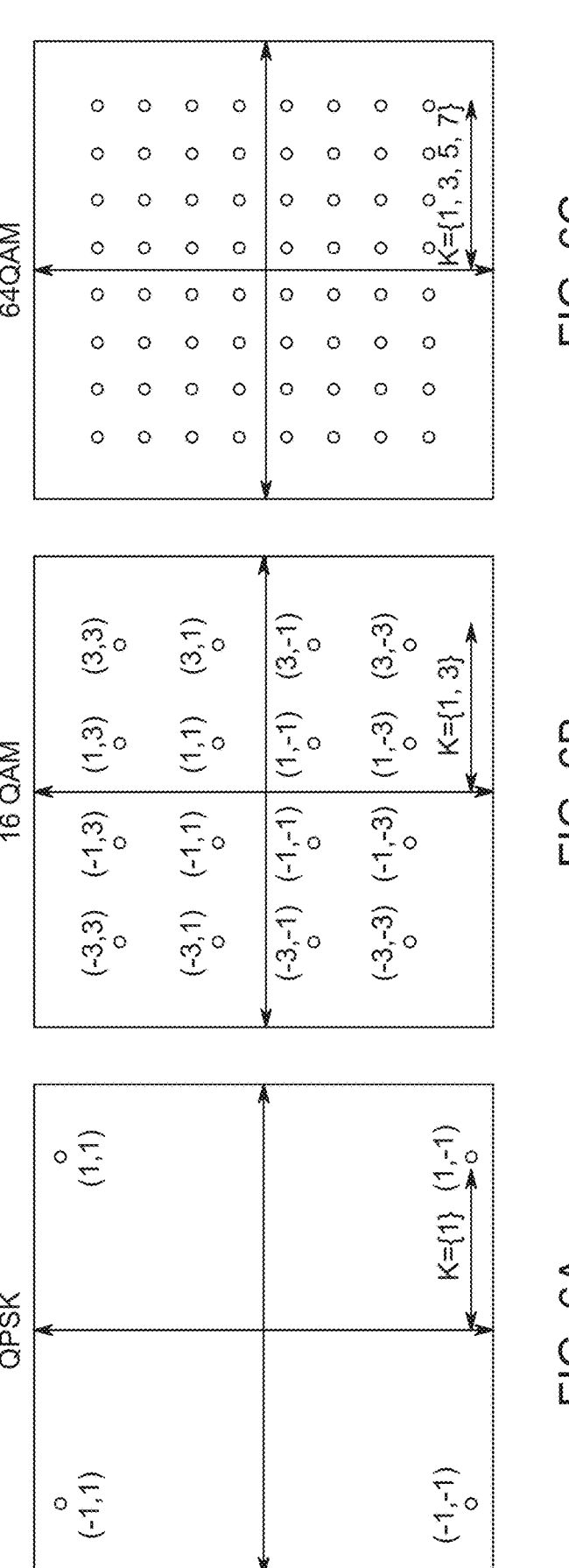
FIG. 6A illustrates a first constellation diagram based on QPSK modulation scheme, according to certain aspects of the present disclosure.
FIG. 6B illustrates a second constellation diagram based on 16-QAM modulation scheme, according to certain aspects of the present disclosure.
FIG. 6C illustrates a third constellation diagram based on 64-QAM modulation scheme, according to certain aspects of the present disclosure.

In some implementations, the number of carriers N depends on a modulation scheme chosen. The modulation scheme can be based on settings in the DU 320 and/or the RRU 314. In an implementation, the modulation scheme is determined by the DU 320. The modulation scheme can FIGS. 6A to 6C will be used in explaining the values in Table 2. Referring to FIGS. 6A-6C, different constellation diagrams based on different modulation schemes are provided, according to certain aspects of the present disclosure. A constellation diagram is a representation of a signal modulated by a digital modulation scheme and displays the signal as a two-dimensional xy-plane scatter diagram in the complex plane at symbol sampling instants. A modulation with G modulation points generally transmits $\log_2$ G bits per sample. In FIG. 6A, QPSK has four constellation points and can send two bits per sample. From the origin of the xy-plane, the coordinates for the four constellation points in reference to K are (1, 1), (−1, 1), (−1, −1), and (1, −1). The four constellation points in reference to binary code are 00, 01, 11, and 10, respectively. Only one size square can be drawn, with the corner of that square coinciding with the coordinates for the four constellation points. The half-length of the side of this square is 1, thus, in Table 2, QPSK only has one size ±1.

In FIG. 6B, 16-QAM has sixteen constellation points and can send four bits per sample. From the origin of the xy-plane, the coordinates for the sixteen constellation points in reference to K values are (1, 1), (−1, 1), (−1, −1), (1, −1), (3, 1), (3, 3), (1, 3), (−1, 3), (−3, 3), (−3, 1), (−3, −1), (−3, −3), (−1, −3), (1, −3), (3, −3), (3, −1). Similar to QPSK, each of these constellation points references a binary code. Squares of two sizes can be drawn for 16-QAM. The first and smaller square includes the inner constellation points (1, 1), (−1, 1), (−1, −1), and (1, −1). The second and larger square includes the outer constellation points (3, 1), (3, 3), (1, 3), (−1, 3), (−3, 3), (−3, 1), (−3, −1), (−3, −3), (−1, −3), (1, −3), (3, −3), and (3, −1). The half-length of the size of the first square is 1, and the half-length of the size of the second square is 3. Thus, in Table 2, if K=3, then a square with half-length 3 can encompass constellation points with coordinates within the first square (±1, ±1) and the second square (±3, ±3). This is provided in shorthand in the first column as "±⅓, ±3/3" under "max. length" column. If K=1, then a square with half-length 1 can only encompass constellation points within the first square (±1, ±1), therefore, this is provided in shorthand in the second column as "±1" under "2nd max. length" column. K=1 is the smallest size square, so the third column "3rd max. length" has the same values as the second column.

In FIG. 6C, 64-QAM has sixty-four constellation points and can send eight bits per sample. A similar analysis can be repeated as already done with FIGS. 6A and 6B. Four squares can be drawn for 64-QAM with half-lengths of the squares varying from largest to smallest as 7, 5, 3, and 1 in a first square, a second square, a third square, and a fourth square, respectively. Table 2 provides shorthand for constellation points encompassed by the first square in "max. length" column, the second square in "2nd max. length" column, and the third square in "3rd max. length" column. Based on the constellation measure K, different constellation points can be covered by different sized squares of half-length K.

Figure 7:
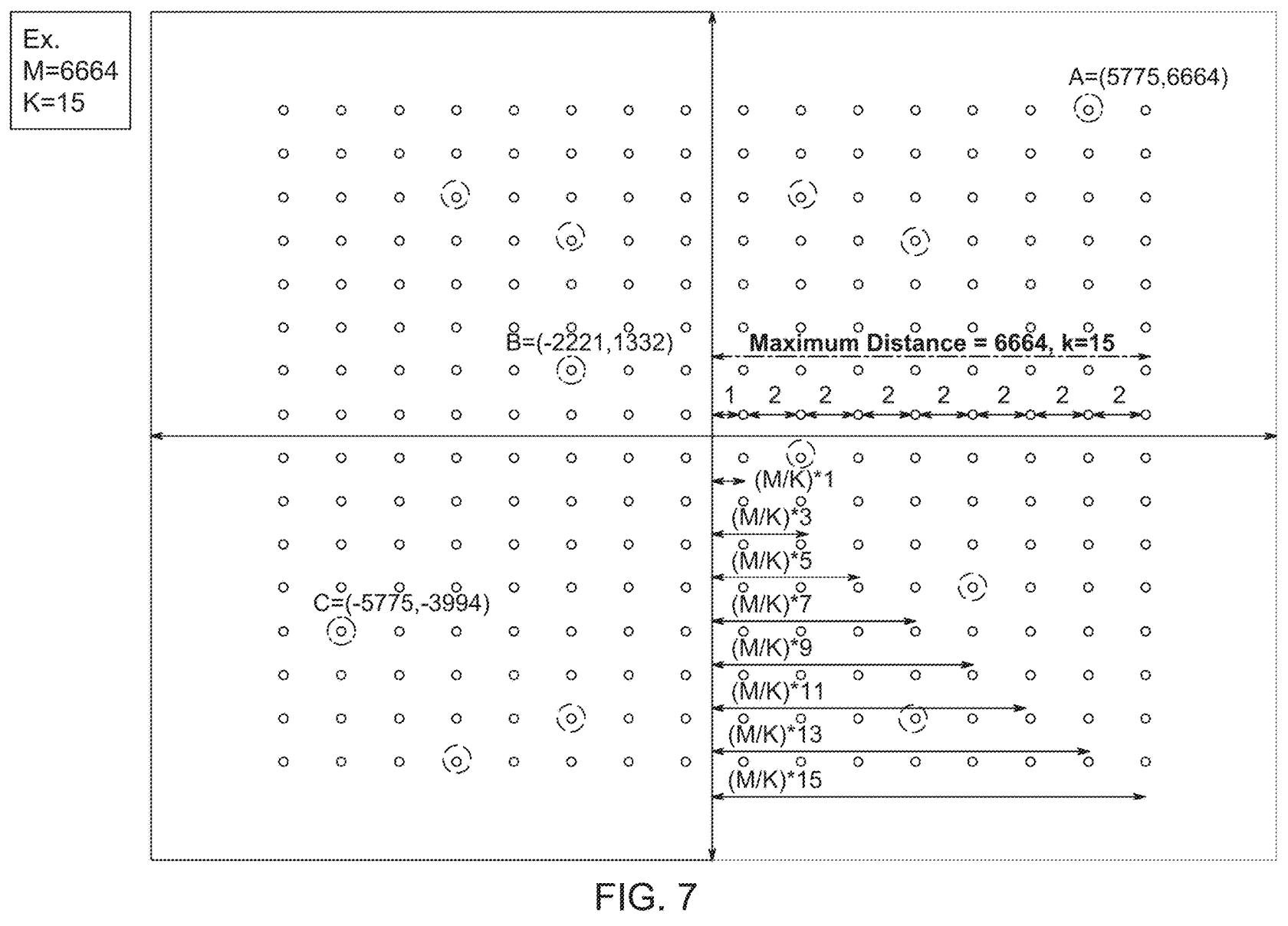
Figure 8:
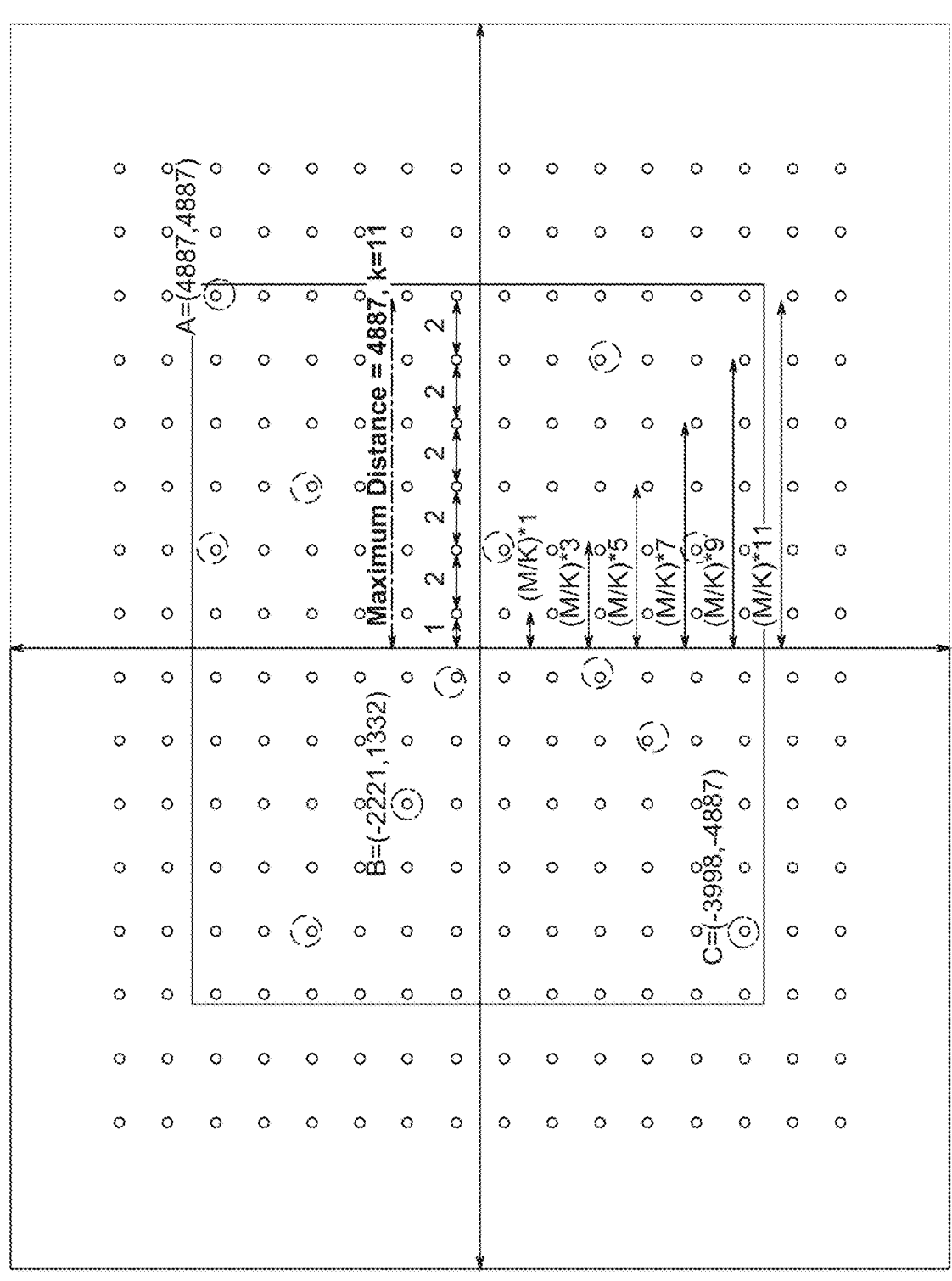
FIG. 8 is an example constellation diagram for 256-QAM, according to certain aspects of the present disclosure.

A similar analysis can be performed for 256-QAM. FIG. 7 is an example constellation diagram for 256-QAM, according to certain aspects of the present disclosure, where IQ data of a physical resource block has a maximum distance of 6664 and K=15. FIG. 8 is an example constellation diagram for 256-QAM, according to certain aspects of the present disclosure, where IQ data for a physical resource block has a maximum distance of 4887 and K=11.

Returning back to FIG. 5 and the example IQ data of Table 1, the coordinates $(X1_i\ X1_q)\ \ldots\ (XN_i,\ XN_q)$ when plotted on the constellation diagram for 256-QAM will have coordinates that include a K value of 15, corresponding to the $X_{max}$ value of 6664 obtained in step 504.

At step 508, the DU 320 casts the IQ data as compressed IQ data using the maximum absolute value $X_{max}$ and the constellation measure K.

In some implementations, the compressed IQ data is represented as Z in (3).

$$Z = \{Z1_iZ1_qZ2_iZ2_q\ \ldots\ ZN_iZN_q\} \tag{3}$$

In (3), Z takes on values of x and y coordinates on the constellation diagram where x values can represent in-phase component (real part) and y values represent corresponding quadrature phase component (imaginary part). Note that convention can be changed such that the x values can represent quadrature component and y values represent corresponding in-phase component.

In some implementations, each value in Z is obtained using (4).

$$Z = \text{round}\left(\frac{K}{X_{max}}\{X1_iX1_qX2_iX2_q\ \ldots\ XN_iXN_q\}\right) \tag{4}$$

Applying (4) to Table 1 provides Table 3.

TABLE 3

| Example IQ data in a PRB | | | | | | | | | | | |
|---|---|---|---|---|---|---|---|---|---|---|---|
| $Z1_i$ | $Z2_i$ | $Z3_i$ | $Z4_i$ | $Z5_i$ | $Z6_i$ | $Z7_i$ | $Z8_i$ | $Z9_i$ | $Z10_i$ | $Z11_i$ | $Z12_i$ |
| 13 | 5 | 13 | −9 | 1 | −13 | 9 | 3 | 11 | 15 | −13 | 5 |
| $Z1_q$ | $Z2_q$ | $Z3_q$ | $Z4_q$ | $Z5_q$ | $Z6_q$ | $Z7_q$ | $Z8_q$ | $Z9_q$ | $Z10_q$ | $Z11_q$ | $Z12_q$ |
| 13 | −1 | −9 | 5 | −15 | −5 | 9 | −11 | −11 | −9 | −9 | 3 |

A benefit of the compression is that fewer bits are used to represent IQ data. For example, as provided above in reference to Table 1, $X6_q=-2221_{10}$ is the equivalent of 1111 0111 0101 0011₂. $X6_q$ is encoded with 16 bits. In comparison, corresponding $Z6_q=-5_{10}$ which is equivalent to 11010₂. $Z6_q$ can be encoded with 5 bits where the most significant bit encodes the sign (e.g., 0 for positive and 1 for negative), and the next four bits encode the value (e.g., 5).

In some implementations, the DU 320 provides $X_{max}$, K, and Z to the RRU 314 as a single output stream $Y=\{X_{max}, K, Z\}$.

In the example of Tables 1 and 3, the number of bits for the output stream Y can be 16 bits to encode $X_{max}$, 4 bits to encode K, and 5 bits to encode each value in Z. Correspondingly, the number of bits total for Y equals 16+4+5×12+5× 12=140 bits. Compared to Table 1, the total number of bits for transmitting the uncompressed IQ data requires at least 16 bits for each value in X. Therefore, the total bits to transmit the uncompressed IQ data is 16×12+16×12=384 bits. According to the provided example, the compression rate can be 140/384=0.3646 or 36.46%. This compression rate is low, without any compression loss.

Figure 9:
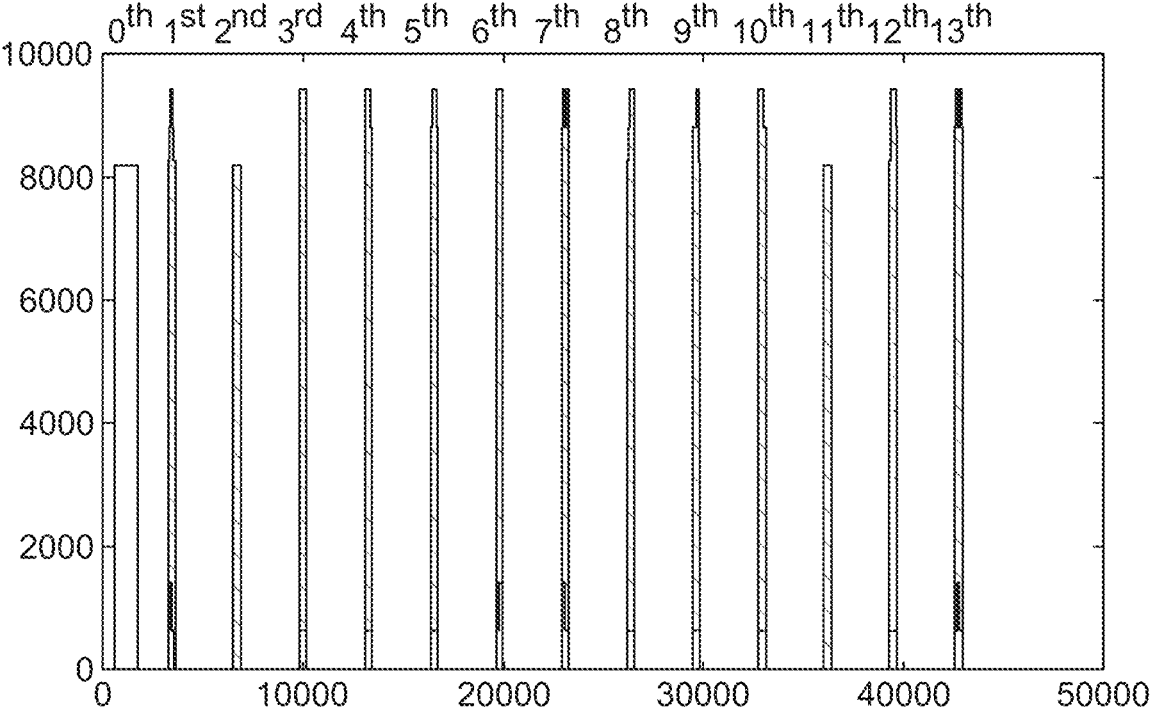
FIG. 9 is a graph showing IQ data amplitude per 5G NR timeslot in frequency domain.

Referring to FIG. 9, IQ data amplitude per 5G NR timeslot in frequency domain. The 0th, 2nd, and 11th symbols have a constant amplitude and are of consistent strength compared to the other symbols. The 0th, 2nd, and 11th symbols are reference signals and control plane messages with smaller IQ data amplitude. For the other symbols, the irregular shapes of the bars indicate that the maximum absolute value of the amplitude can vary and can be different on each physical resource block and/or on each symbol. Therefore, for each symbol being transmitted and/or for each physical resource block, retrieving the maximum absolute value is the first step, as provided, for example, in step 504 of FIG. 5.

Figure 10:
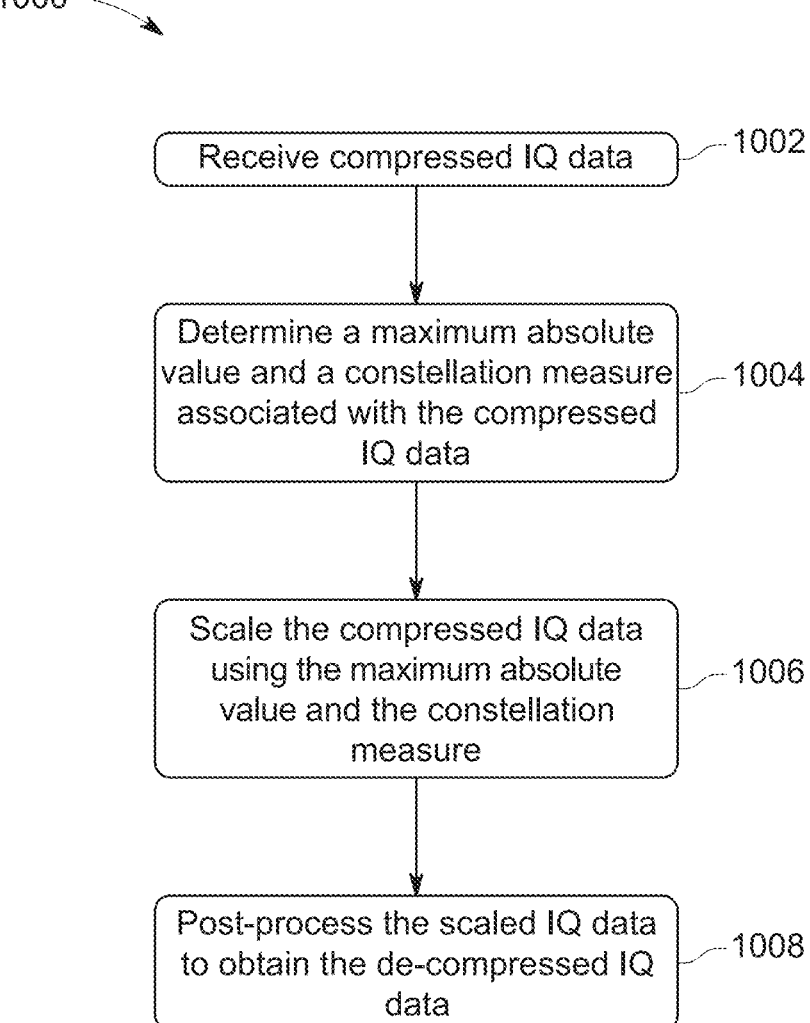
FIG. 10 is a flow diagram illustrating steps for decompressing IQ data, according to certain aspects of the present disclosure.

Referring to FIG. 10, a flow diagram illustrating a process 1000 for decompressing compressed IQ data is provided, according to certain aspects of the present disclosure. The process 1000 can be performed by the RRU 314 of the ORAN architecture 300 to receive IQ signals from the DU 320 to the RRU 314 via the fronthaul 312. The process 1000 can be performed by a second computing system communicating with a first computing system and is not limited to the ORAN architecture. The ORAN architecture is used here as an example with the first computing system pertaining to the DU 320 and the second computing system pertaining to the RRU 314.

At step 1002, the RRU 314 receives compressed IQ data. In some implementations, the RRU 314 receives the compressed IQ data in a single stream Y={$X_{max}$, K, Z}. The compressed IQ data can include information pertaining to a maximum absolute value and a constellation measure as described above in connection with FIG. 5.

At step 1004, the RRU 314 determines the maximum absolute value and a constellation measure associated with the compressed IQ data. In some implementations, a certain number of bits within a single stream are designated for the maximum absolute value and a constellation measure. The RRU 314 can determine these values based on bit positioning. In the example provided above where Y={$X_{max}$, K, Z} and 16 bits encode $X_{max}$ and 4 bits encode K, and the bits for $X_{max}$ precede that of K, then the RRU 314 can determine that the first 16 bits are $X_{max}$ and the next four bits are K. Afterward, the next 120 bits are Z. In the example, the maximum absolute value $X_{max}$ can be extracted as 6664, and the value K can be extracted as 15.

At step 1006, the RRU 314 scales the compressed IQ data using the maximum absolute value and the constellation measure.

In some implementations, (4) is rearranged to obtain X' as defined in (5), where X=round (X').

$$X' = \frac{X_{max}}{K}\{Z1_iZ1_qZ2_iZ2_q \ \ldots \ ZN_iZN_q\} \tag{5}$$

Applying (4) to Table 3 provides Table 4.

TABLE 4

| Preprocessed data | | | | | |
|---|---|---|---|---|---|
| X1'$_i$ | X2'$_i$ | X3'$_i$ | X4'$_i$ | X5'$_i$ | X6'$_i$ |
| 5775.467 | 2221.333 | 5775.467 | −3998.4 | 444.2667 | −5775.47 |
| X1'$_q$ | X2'$_q$ | X3'$_q$ | X4'$_q$ | X5'$_q$ | X6'$_q$ |
| 5775.467 | −444.267 | 3998.4 | 2221.333 | −6664 | −2221.33 |
| X7'$_i$ | X8'$_i$ | X9'$_i$ | X10'$_i$ | X11'$_i$ | X12'$_i$ |
| 3998.4 | 1333.8 | 4886.933 | 6664 | −5775.47 | 2221.333 |
| X7'$_q$ | X8'$_q$ | X9'$_q$ | X10'$_q$ | X11'$_q$ | X12'$_q$ |
| 3998.4 | −4887.93 | −4887.93 | −3998.4 | −3998.4 | 1333.8 |

At step 1008, the RRU 314 post-processes the scaled IQ data to obtain decompressed IQ data. In some implementations, the post-processing involves rounding out the scaled IQ data values obtained at step 1006. Applying the round function to the values in Table 4 yields the values of Table 1. Therefore, the compression algorithm provided herein is lossless and compatible with downlink communication in ORAN.

Comparing with block floating point used in ORAN, the present algorithm is lossless. Block floating point is lossy because it involves losing the least significant bits. Block floating point includes move information and number of bits for each value. For example, given 16 bit data 0000 0000 1011 0100, if the move information is 4 and the number of bits for each value is 12, then block floating point will encode move information of 4 as 2 bits, number of bits for each value is encoded as 4 bits, and then the data is provided as 12 bits. In a system where the number of bits for each value and the move information does not change, then there is no need to send such information.

Figure 11:
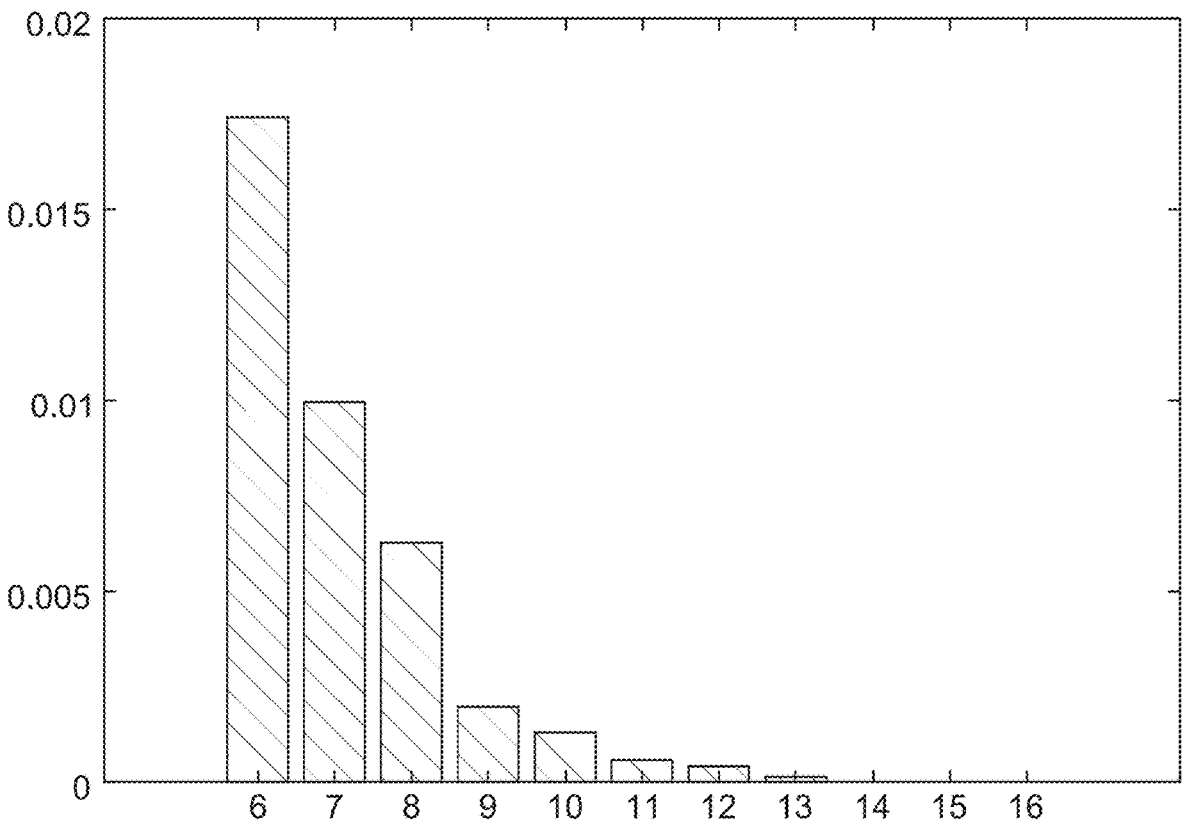
FIG. 11 is a graph illustrating error vector magnitude (EVM) evaluation on different bits of block floating point compression.

FIG. 11 is a graph illustrating error vector magnitude (EVM) evaluation on different bits of block floating point compression. The y-axis of the graph in FIG. 11 is an error rate associated with bit compression. The scale range ranges from 0.5% to 2%. As provided in FIG. 11, block floating point compression introduces a percentage error as the number of bits compressed rises (i.e., as the compression ratio increases). Compression ratio for block floating point compression for 16 bit IQ data is provided in Table 5. In some implementations, the compression ratio of 36.46% for IQ data is comparable to 6 bit block floating point compression ratio of 37.5%. But block floating point is lossy while the present disclosure provides lossless compression.

TABLE 5

| Block floating point compression information | | | | | | | | | | |
|---|---|---|---|---|---|---|---|---|---|---|
| Compression Ratio | | | | | | | | | | |
| 6 | 7 | 8 | 9 | 10 | 11 | 12 | 13 | 14 | 15 | 16 |
| 37.5% | 43.75% | 50.0% | 56.25% | 62.5% | 68.75% | 75% | 81.25% | 87.5% | 93.75% | 100% |

(first column label: Compres-sion Bits)

Embodiments of the present disclosure can provide a compression ratio of 36.46%, which is approximately block floating point 6-bit compression performance without damaging any 5G signals. Radio units can easily decompress, similar to the block floating point decompression algorithm. In mobile network communication, as the need for bandwidth and more MIMO paths increase, total fronthaul capacity must also increase. Low-bit compression using block floating point can help meet requirements but produces signal distortions. Embodiments of the present disclosure provide systems and methods that will not provide 5G signal compression distortion.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments can be made in accordance with the disclosure herein, without departing from the spirit or scope of the disclosure. Thus, the breadth and scope of the present disclosure should not be limited by any of the above described embodiments. Rather, the scope of the disclosure should be defined in accordance with the following claims and their equivalents.

What is claimed is:

1. A system comprising:
one or more data processors; and
a non-transitory computer-readable storage medium containing instructions which, when executed on the one or more data processors, cause the one or more data processors to perform operations including:
receiving a stream of in-phase components and quadrature phase components as IQ data, the IQ data indicating which subcarriers each of the IQ data is to be sent,
determining a maximum absolute value associated with the IQ data,
determining a constellation measure of a largest bounding box covering all subcarriers of the IQ data,
compressing the IQ data to obtain compressed IQ data based on the maximum absolute value and the constellation measure, and
transmitting the compressed IQ data on a fronthaul network interface using a fewer number of bits compared to the received IQ data.

2. The system of claim 1, wherein the IQ data includes 12 subcarriers.

3. The system of claim 1, wherein a number of bits of each in-phase component is 16 bits and a number of bits of each quadrature component is 16 bits.

4. The system of claim 1, wherein executing the instructions further causes the one or more data processors to perform operations including determining a modulation scheme associated with transmitting the IQ data.

5. The system of claim 4, wherein the modulation scheme is one of QPSK, 16-QAM, 64-QAM or 256-QAM.

6. The system of claim 1, wherein the compressed IQ data are transmitted to a radio unit.

7. The system of claim 6, wherein a distribution unit transmits the compressed IQ data to the radio unit.

8. The system of claim 6, wherein the compressed IQ data includes the maximum absolute value and the constellation measure.

9. The system of claim 1, wherein a number of bits associated with the constellation measure is less than a number of bits associated with the maximum absolute value.

10. The system of claim 1, wherein the compressed IQ data preserves information contained in the IQ data.

11. A system comprising:
one or more data processors; and
a non-transitory computer-readable storage medium containing instructions which, when executed on the one or more data processors, cause the one or more data processors to perform operations including:
receiving compressed IQ data on a fronthaul network interface using a first number of bits, the compressed IQ data including (i) a maximum absolute value associated with a stream of IQ data and (ii) a constellation measure of a largest bounding box covering all subcarriers of the stream of IQ data,
determining the maximum absolute value associated with the IQ data,
determining the constellation measure associated with the IQ data,
scaling at least a portion the compressed IQ data based on the maximum absolute value and the constellation measure, and
post-processing the scaled IQ data to obtain de-compressed IQ data having a second number of bits, the second number of bits being greater than the first number of bits.

12. The system of claim 11, wherein the stream of IQ data and the decompressed IQ data are the same.

13. The system of claim 12, wherein the post-processing includes rounding.

14. The system of claim 11, wherein a modulation scheme associated with the stream of IQ data is one of QPSK, 16-QAM, 64-QAM or 256-QAM.

15. A method performed by a computing system, the method comprising:
receiving a stream of in-phase components and quadrature phase components as IQ data, the IQ data indicating which subcarriers each of the IQ data is to be sent;
determining a maximum absolute value associated with the IQ data;
determining a constellation measure of a largest bounding box covering all subcarriers of the IQ data;
compressing the IQ data to obtain compressed IQ data based on the maximum absolute value and the constellation measure; and
transmitting the compressed IQ data on a fronthaul network interface using a fewer number of bits compared to the received IQ data.

16. The method of claim 15, further comprising determining a modulation scheme associated with transmitting the IQ data.

17. The method of claim 16, wherein the modulation scheme is one of QPSK, 16-QAM, 64-QAM or 256-QAM.

18. The method of claim 17, wherein the compressed IQ data are transmitted to a radio unit.

19. The method of claim 18, wherein a distribution unit transmits the compressed IQ data to the radio unit.

20. The method of claim 18, wherein the compressed IQ data includes the maximum absolute value and the constellation measure.

* * * * *